United States Patent
Tanaka et al.

(10) Patent No.: US 6,878,484 B2
(45) Date of Patent: Apr. 12, 2005

(54) SEPARATOR FOR SECONDARY BATTERY AND METHOD FOR PRODUCING THE SAME

(75) Inventors: Toshio Tanaka, Ohtsu (JP); Hiroki Yamaguchi, Ohtsu (JP); Naohiko Takimoto, Ohtsu (JP); Masahiro Yamashita, Princeton Junction, NJ (US)

(73) Assignee: Toyo Boseki Kabushiki Kaisha, Osaka (JP)

( * ) Notice: Subject to any disclaimer, the term of this patent is extended or adjusted under 35 U.S.C. 154(b) by 544 days.

(21) Appl. No.: 09/985,077

(22) Filed: Nov. 1, 2001

(65) Prior Publication Data

US 2002/0076615 A1 Jun. 20, 2002

(30) Foreign Application Priority Data

| Nov. 1, 2000 | (JP) | 2000-334876 |
| Feb. 19, 2001 | (JP) | 2001-042043 |
| Apr. 5, 2001 | (JP) | 2001-107271 |
| Apr. 16, 2001 | (JP) | 2001-117200 |
| Apr. 19, 2001 | (JP) | 2001-121436 |

(51) Int. Cl.⁷ .............................................. H01M 2/16
(52) U.S. Cl. .................... 429/145; 429/147; 429/247; 429/248; 429/249; 429/250; 29/623.1; 521/27
(58) Field of Search .................... 521/27; 29/623.1; 429/145, 147, 247, 248, 249, 250

(56) References Cited

U.S. PATENT DOCUMENTS

| 5,955,216 A | 9/1999 | Hoshina et al. ............. 429/144 |
| 6,042,970 A | 3/2000 | Senyarich et al. .......... 429/248 |
| 6,607,859 B1 * | 8/2003 | Tanaka et al. .............. 429/145 |

FOREIGN PATENT DOCUMENTS

| JP | 10326607 | 12/1998 |
| JP | 2000230074 | 8/2000 |
| JP | 2000248095 | 9/2000 |

* cited by examiner

Primary Examiner—Bruce F. Bell
(74) Attorney, Agent, or Firm—Kenyon & Kenyon (57) ABSTRACT

An object of the present invention is to provide a thin battery separator having an excellent nitrate group trapping performance and a high piercing strength. The inventive separator for a secondary battery, which can accomplish such an object, is made of a resin composition mainly containing a polyolefin having a hydrophilic functional group, wherein the resin composition has a content (ratio to a total resin amount) of a low-density polyethylene of 20 mass % or less, a piercing strength of 5 to 100 N, a Metsuke of 20 to 75 g/m², a thickness of 15 to 150 μm, and an unneutralized hydrophilic functional group amount of $1 \times 10^{-3}$ to $5 \times 10^{-2}$ mol/m².

18 Claims, 5 Drawing Sheets

SEPARATOR FOR SECONDARY BATTERY AND METHOD FOR PRODUCING THE SAME

BACKGROUND OF THE INVENTION

1. Field of the Invention

The present invention relates to a separator for a closed alkaline secondary battery such as a nickel-hydrogen battery or a nickel-cadmium battery and a method for producing such a separator.

More specifically, the present invention relates to a secondary battery separator having an excellent function of trapping impurities in an alkaline electrolytic solution, a battery using such a separator, and a method for producing the inventive secondary battery by giving a hydrophilic functional group to a material for the separator.

2. Description of the Prior Art

Figure 5:
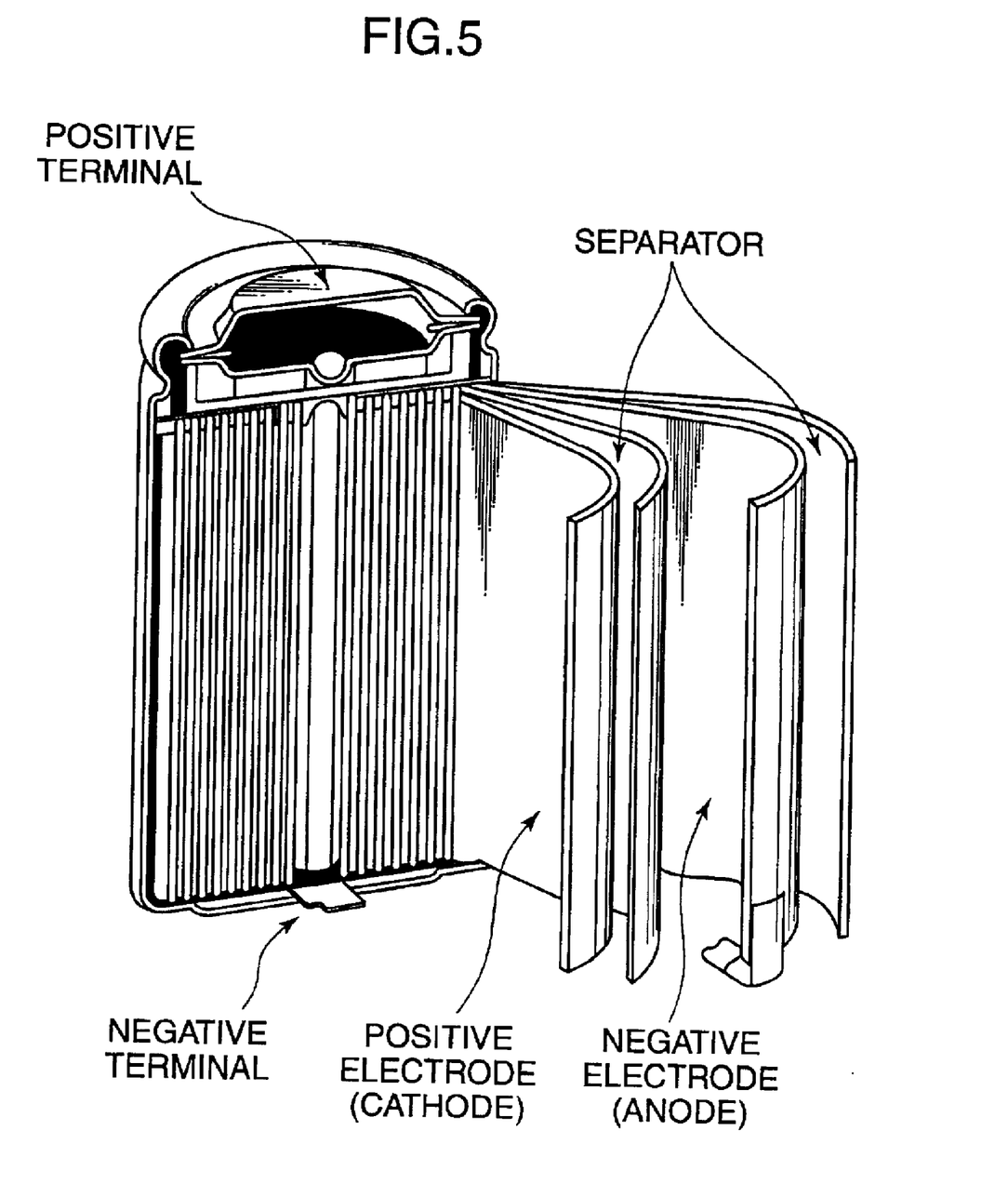
FIG. 5 is a schematic diagram showing an example of a closed secondary battery.

As shown in FIG. 5, a positive electrode and a negative electrode are separated by a separator and accommodated in a container while being immersed in an electrolytic solution in a closed alkaline secondary battery. A self-discharging phenomenon that a charged amount decreases with time if a charged alkaline secondary battery is kept is known. Particularly, a nickel-hydrogen battery using a hydrogen-occluded alloy as a negative electrode is known to have a considerable reduction in the charged amount due to self-discharging. For example, a separator using polyamide fibers is hydrolyzed by an electrolytic solution to produce nitride compounds. Such nitride compounds cause the self-discharging phenomenon. Substances that cause the self-discharging phenomenon such as nitrate groups are produced not only by hydrolysis of the separator, but also by oxidation of ammonia mixed in the battery. Accordingly, an amount of nitrate groups can be reduced by reducing an amount of ammonia present in the secondary battery, thereby enabling suppression of self-discharging. However, since ammonia is likely to be mixed, as impurities, in a manufacturing process of electrodes, it is difficult to completely prevent ammonia from being mixed into the battery.

Accordingly, there has been proposed a separator which is not hydrolyzed in an electrolytic solution unlike the separator made of polyamide fibers and can trap ammonia in the electrolytic solution. For example, there has been proposed a technique of introducing functional groups having an ion exchange ability such as sulfonic groups and carbonate groups into polyolefin fibers by applying various hydrophilic treatments such as sulfonation and graft polymerization of hydrophilic monomers to the polyolefin fibers.

Separators having a high ion exchange amount which are obtained by applying a hydrophilic treatment to polyolefin fibers has been proposed (Japanese Unexamined Patent Publications No. 10(HEI)-326607, No. 10(HEI)-116600). However, the separator into which functional groups are introduced by applying a hydrophilic treatment by graft polymerization lacks practicability since it has a low heat resistance although having a high self-discharging suppressing performance at room temperature. For example, if this separator is used in an environment of a relatively high temperature of 60° C. or higher, carboxylic acid groups fall off from the separator, resulting in a reduced ammonia trapping performance and according an increased self-discharging amount.

There is a technique of applying sulfonation to polyolefin fibers to obtain a separator in which functional groups are stable at relatively high temperature. However, polyolefin fibers such as polyethylene fibers and polypropylene fibers are difficult to sulfonate since they have a high acid resistance. Accordingly, if sulfonic groups are introduced to the insides of the fibers, it causes a problem of reduced strength of the fibers.

There is also known a technique of applying sulfonation to fibers having a relatively low acid resistance such as polystyrene fibers. Sulfonated polystyrene fibers are poor in ammonia trapping performance and have a considerable progress of self-discharging since sulfonic groups can be easily introduced into the outer surfaces of the fibers, although they have a high ion exchange amount.

The separators produced using the fibers to which various treatments such as sulfonation are applied have all a high capacity retaining rate and a suppressed degree of self-discharging as compared to the conventional separators. However, these separators also have a problem of reduced strength and are by no means said to possess a sufficient practicability.

Further, in response to a demand for higher capacity and higher output of a battery, a technique of reducing a occupied volume of the separator in a battery by making the thickness of the separator maximally thinner has been developed in recent years. For example, in order to increase a capacity of a nickel-hydrogen battery, thin separators having a thickness of 150 μm or smaller, or even 120 μm or smaller have been developed. However, in order to put secondary batteries having a high capacity to practical use, there has been a demand for separators which can attain a high capacity retaining rate by suppressing self-discharging, and have sufficient strength.

Various types of thin separators have been proposed thus far. These proposed separators include, for example, one made thinner by compressing a separator, into which functional groups are introduced by sulfonation, at high pressure. However, oxygen gas permeability is reduced as the separator is compressed, and an inner pressure is likely to rise due to oxygen gas produced at a final stage of charging. Thus, there are dangers of a liquid leak or destruction of the battery.

In order to thin the separator without causing a liquid leak and destruction of the battery as the oxygen gas permeability of the separator decreases, a technique of decreasing a Metsuke (g/m$^2$) of the separator has been proposed. However, this technique has a problem that the strength of the separator decreases as the Metsuke decreases. Particularly, since the piercing strength of the separator is considerably reduced as the Metsuke decreases, flushes of the electrodes pierce the separator during a manufacturing process of the battery, thereby causing a short circuit. This results in an increase in the defect rate of the battery.

A method for increasing a fiber density is being considered as a technique of suppressing an occurrence of a short circuit resulting from the reduced Metsuke. However, since a spatial volume within the fibers decreases if the fiber density is increased, liquid retaining property and the gas permeability of the separator decrease. This causes a problem of a large increase in the inner pressure of the battery.

With the prior art technique, it has been difficult to maintain the strength of the separator and to improve a capacity retaining rate of the separator.

SUMMARY OF THE INVENTION

It is an object of the present invention to provide a thin separator having an excellent nitrate group trapping performance and a high piercing strength.

In order to accomplish the above object, the invention is directed to a secondary battery separator made of a resin composition mainly containing a polyolefin having a hydrophilic functional group, characterized in that the resin composition has a content (ratio to a total resin amount) of a low-density polyethylene of 20 mass % or less, a piercing strength of 5 to 100 N, a Metsuke of 20 to 75 g/m$^2$, a thickness of 15 to 150 μm (inclusive), and an unneutralized hydrophilic functional group amount of $1\times10^{-3}$ to $5\times10^{-2}$ mol/m$^2$ (inclusive).

The unneutralized hydrophilic functional group amount is measured by a following equation: amount of unneutralized hydrophilic functional groups (mol/m$^2$)=(total sulfur amount (ppm)×Metsuke (g/m$^2$)/32.66/1000−ion exchange amount (meq/m$^2$))/1000. In this equation, total sulfur amount:

A separator of 30 cm$^2$ is completely burnt at a high temperature of 1400° C. in an oxygen gas flow, its concentration is measured by an infrared detector, and a value measured in accordance with a calibration curve prepared using a standard substance containing sulfur is referred to as a total sulfur amount.

Ion exchange amount:

After being immersed in a HCl solution of 1 mol/dm$^3$ for 1 hour, a separator of 30 cm$^2$ is washed with an ion exchange solution several times until its pH becomes 6 to 7. Subsequently, this separator is dried for 2 hours by a blow drier at 60° C. and cooled to room temperature. After the cooled separator is immersed in 100 cm$^3$ of a KOH solution of 0.01 mol/dm$^3$ and shaken at 45° C. for 1 hour, it is taken out and 25 cm$^3$ of the solution is collected and titrated with a HCl solution of 0.01 mol/dm$^3$ for neutralization. A blank solution is similarly titrated and an ion exchange amount by potassium ions is calculated by following equation:

ion exchange amount (meq/m$^2$)={(V0−V1)×100×0.01×f}/(0.003× 25)

where

V1: amount of the HCl solution (cm$^3$) required to titrate the sample

V0: amount of the HCl solution (cm$^3$) required to titrate the blank solution f: factor of the HCL solution.

The present invention having the above features can provide a separator having a high capacity retaining rate and a high tensile strength.

DETAILED DESCRIPTION OF THE PREFERRED EMBODIMENTS OF THE INVENTION

As a result of repeated devoted researches and studies of the inventors of the present invention on thin separators having an excellent nitrate group trapping performance and a high piercing strength, it was found that such an object could be accomplished by using a battery separator made of a resin composition mainly containing a polyolefin having hydrophilic functional groups, wherein the resin composition has a content (ratio to a total resin amount) of a low-density polyethylene of 20 mass % or less, a piercing strength of 5 to 100 N, a Metsuke of 20 to 75 g/m$^2$, a thickness of 15 to 150 μm (inclusive), and an unneutralized hydrophilic functional group amount of $1\times10^{-3}$ to $5\times10^{-2}$ mol/m$^2$ (inclusive).

It should be noted that the unneutralized hydrophilic functional group amount (mol/m$^2$) is measured by (total sulfur amount (ppm)×Metsuke (g/m$^2$)/32.66/1000−ion exchange amount (meq/m$^2$))/1000. In this equation, the total sulfur amount is a value obtained as follows. A separator of 30 cm$^2$ is completely burnt at a high temperature of 1400° C. in an oxygen gas flow, its concentration is measured by an infrared detector, and a value measured in accordance with a calibration curve prepared using a standard substance containing sulfur is referred to as a total sulfur amount. Further, the ion exchange amount is obtained as follows. After being immersed in a HCl solution of 1 mol/dm$^3$ for 1 hour, a separator of 30 cm$^2$ is washed with an ion exchange solution several times until its pH becomes 6 to 7. Subsequently, this separator is dried for 2 hours by a blow drier at 60° C. and cooled to room temperature. After the cooled separator is immersed in 100 cm$^3$ of a KOH solution of 0.01 mol/dm$^3$ and shaken at 45° C. for 1 hour, it is taken out and 25 cm$^3$ of the solution is collected and titrated a HCl solution of 0.01 mol/dm$^3$ for neutralization. A blank solution is similarly titrated and a potassium ion exchange amount is calculated by following equation: ion exchange amount (meq/m$^2$)={(V0−V1)×100×0.01×f}/(0.003×25) where V1: amount of the HCl solution (cm$^3$) required to titrate the sample, V0: amount of the HCl solution (cm$^3$) required to titrate the blank solution, f: factor of the HCL solution.

It is recommended to use fiber aggregates such as nonwoven fabrics, woven fabrics and knitted fabrics, and sheet-shaped porous materials such as porous films and porous foamed materials for the inventive separator. Among these, unwoven fabrics and porous films which are excellent in various properties such as processability and durability and suited to later-described various processings according to the present invention are preferable, and unwoven fabrics are most preferable. The inventive separator desirably has hydrophilic functional groups in order to trap nitrate groups and suppress a self-discharging phenomenon. In the present invention, porous materials means to possess a multitude of fine pores penetrating a sheet-shaped material from one surface to the other.

If charging and discharging of a battery are repeated, an activated substance forming the electrodes are freed from the electrodes and exist in the form of fine particles in an electrolytic solution. The separator used in the present invention is a porous material and has pores penetrating the separator from its front surface to its rear surface. It is desirable to increase the diameter of the pores in order to enhance gas permeability. However, if the thickness of the separator is made thinner, e.g. to 150 μm or smaller, there is a higher possibility that the activated substance (e.g. electrode activated substance freed from the electrodes) in the form of fine particles enters the pores to cause a short circuit. In order to suppress an occurrence of a short circuit caused by such entrance of the fine particles, the pore diameter of the separator is preferably small. Thus, the maximum diameter of the pores is preferably 60 μm or smaller, more preferably 50 μm or smaller, further more preferably 40 μm or smaller and most preferably 30 μm or smaller.

A volume taken up by the pores of the separator is preferably 20% or more and more preferably 30% or more of the volume of the separator, and is preferably 90% or less and more preferably 70% or less of the volume of the separator. If the volume taken up by the pores is below 20%, a sufficient oxygen gas permeability may not be obtained, thereby increasing an inner pressure. Conversely, if this volume exceeds 90%, a sufficient piercing strength may not be maintained, thereby causing a short circuit.

In the case that the inventive separator is made of an unwoven fabric, pores of desired size can be formed in the unwoven fabric by adjusting an interlacing method of resin fibers when the unwoven fabric is fabricated. The gas permeability (according to the Fragile method) of the separator is preferably 60 cc/cm$^2$/s or lower, and more preferably 40 cc/cm$^2$/s or lower. If gas permeability exceeds 60 cc/cm$^2$/s, it is not preferable because the strength of the separator is reduced. Particularly in the case of the unwoven fabric, fibers are dispersed and pores are large. Thus, in some cases, there may be a small number of intersections of fibers and an effect of improving strength by pressurizing may not be sufficiently obtained. Further, in order to secure permeability of oxygen gas produced at a final stage of charging and suppress an increase in inner pressure, gas permeability is preferably 2 cc/cm$^2$/s or higher, and more preferably 5 cc/cm$^2$/s or higher. If gas permeability is below 2 cc/cm$^2$/s, an amount of oxygen gas produced is larger than an amount thereof let to permeate, with the result that an increase in inner pressure may not be sufficiently suppressed.

In the present invention, the unneutralized hydrophilic functional group amount measured by immersion in an alkaline solution as described above is preferably $1\times10^{-3}$ mol/m$^2$ or more, more preferably $2\times10^{-3}$ mol/m$^2$ or more and preferably $5\times10^{-2}$ mol/m$^2$ or less, more preferably $2\times10^{-2}$ mol/m$^2$. Hydrophilic functional groups such as sulfonic groups have a higher reaction selectivity to potassium ions than to ammonia or ammonium ions. Thus, if ions having a high reaction selectivity such as potassium ions are present in an electrolytic solution, hydrophilic functional groups are neutralized by forming potassium salts. Accordingly, these functional groups lose their ability to trap ammonia or like nitrate groups which degrade a capacity retaining rate. Therefore, in order to suppress self-discharging by trapping ammonia and the like in the electrolytic solution, the unneutralized hydrophilic functional group amount of the separator is preferably $1\times10^{-3}$ mol/m$^2$ or more. Further, the content of the functional group amount exceeding $5\times10^{-3}$ mol/m$^2$ is not undesirable since it degrades the piercing strength of the separator and increases a short-circuiting rate during the manufacturing process of the battery.

In the present invention, the unneutralized hydrophilic functional groups mean functional groups which remain without being neutralized by potassium ions to form salts when being immersed in an alkaline solution as described above and are capable of trapping ammonium ions and other nitrate groups which degrade the capacity retaining rate. The amount of the unneutralized hydrophilic functional groups can be calculated by obtaining a sulfur concentration and an ion exchange amount as described above.

Although sulfonic groups, carboxyl groups, hydroxyl groups, etc. are referred to the "hydrophilic functional groups", the present invention is not limited thereto and any functional group having a hydrophilic nature to alkaline electrolytic solutions is meant as such. The functional group may be suitably selected according to the required properties of the separator and may be introduced into the separator. Among such possible functional groups, sulfonic groups having a high ability to trap ammonium ions is desirable. Hereinafter, description is made taking sulfonic groups as a representative example, but any functional group can be used instead of sulfonic groups.

Sulfur is introduced into the inventive separator as sulfonation undergoes. A total sulfur amount in the separator obtained in the above measurement method is preferably 2000 ppm or more, more preferably 4000 ppm or more, further more preferably 10000 ppm or more, and preferably 50000 ppm or less, more preferably 30000 ppm or less. With the total sulfur amount of 2000 ppm or less, sulfonation may undergo only on the outer surface of the separator and effective sulfonic groups may not be sufficiently introduced into the inside of the separator. Such a separator has a poor ammonia trapping ability although displaying a high ion exchange amount, thus may not be able to sufficiently suppress the self-discharging phenomenon. Although the mount of sulfonic groups introduced into the inside of the separator may be increased by increasing the total sulfur amount, the outer surface of the separator may be peeled off and the piercing strength and tensile strength of the separator may be reduced if it exceeds 50000 ppm.

The ion exchange amount in the separator obtained by the above measurement method is preferably 0.5 meq/m$^2$ or more, more preferably 1.0 meq/m$^2$ or more, and preferably 10 meq/m$^2$ or less, more preferably 8 meq/m$^2$ or less. The hydrophilic nature of the separator and the electrolytic solution may be insufficient and the capacity retaining rate may decrease if the ion exchange amount is below 0.5 meq/m$^2$. If the ion exchange amount exceeds 10 meq/m$^2$, no sufficient amount of the unneutralized sulfonic groups may be obtained, and sulfonation may concentrate on the outer surface of the separator, which causes the inside of the separator not to be sulfonated and degrades the strengths (tensile strength and piercing strength) of the separator.

If the separator is made excessively hydrophilic by graft polymerization, the separator is likely to be deteriorated. Thus, an increase in the mass of the separator due to graft polymerization is preferably suppressed to 40 mass % or less, more preferably to 30 mass % or less.

In the present invention, piercing strength is an index indicating degree of difficulty of electrode flushes to pierce the separator. The smaller this value, the higher the short-circuiting rate. In the present invention, the piercing strength of the separator having a thickness of 150 μm or smaller is preferably 5 N or higher, more preferably 8 N or higher and further more preferably 10 N or higher. Piercing strength below 5 N is undesirable because the separator may be broken due to its insufficient piercing strength to thereby increase the short-circuiting rate of the battery. The higher the piercing strength, the lower the short-circuiting rate. However, the separator having a piercing strength exceeding 100 N is undesirable because it may require the use of a special tool to cut it to a specified size for the battery due to its excessively high strength. It should be noted that piercing strength is a value of a maximum load exerted on a needle when the separator is fixed to a holder in the form of a round hole having a diameter of 1.128 cm and an area of 1 cm$^2$, and the needle whose spherical shape at the leading end is 0.5 R and whose diameter is 1 mmΦ is lowered at a speed of 2 mm/sec. until it pierces a sample.

The Metsuke of the inventive separator is preferably 20 g/m$^2$ or more, more preferably 30 g/m$^2$ or more, and preferably 75 g/m$^2$ or less, more preferably 50 g/m$^2$. A short circuit may be caused by obtaining no sufficient piercing strength if the Metsuke is below 20 g/m$^2$, whereas an increase in inner pressure may not be sufficiently suppressed by obtaining no sufficient gas permeability if the Metsuke exceeds 75 g/cm$^2$.

The thickness of the inventive separator is not particularly limited, but is preferably 15 μm or larger, more preferably 50 μm or larger, further more preferably 70 μm or larger, and preferably 150 μm or smaller, more preferably 125 μm or smaller, further more preferably 120 μm or smaller. Although being thin, the separator can sufficiently suppress an increase in inner pressure and can be incorporated into a battery without taking any special consideration in the manufacturing process of the battery and without being damaged. Further, a battery capacity can be increased by using such a thin separator.

The separator is disposed in a narrow space between a positive electrode and a negative electrode when the battery is manufactured. In the case that the outer surface of the separator in contact with the negative electrode has a high evenness (hardly uneven), since a contact area of the negative electrode and the separator is large even if the separator has a high gas permeability, no sufficient area can be ensured where oxygen gas permeated through the separator is in contact with the negative electrode. Thus, an oxygen gas absorbing speed of the negative electrode per unit area is slower than an oxygen gas producing speed of the positive electrode. Thus, the inner pressure of the battery may increase, which may finally lead to destruction of the battery. Accordingly, if at least one surface of the separator is uneven as described above, a space can be defined between the electrode and the separator, and a contact area of the oxygen gas and the negative electrode is increased. Therefore, such an uneven surface is desired since it increases the oxygen gas absorbing speed and has a high effect of suppressing an increase in inner pressure. Further, since oxygen gas is temporarily stored in this space, an increase in inner pressure can be suppressed even if the oxygen gas absorbing speed is slow. In order to efficiently display the inner pressure increase suppressing effect by the unevenness as described above, it is desirable to construct the battery such that the uneven surface of the separator and the negative electrode are opposed to each other.

The cross section of the unevenness formed on the separator is not particularly limited. For example, the cross section may be U-shaped, V-shaped or rectangular as shown in FIGS. 1A to 1F. The unevenness or either recesses or projections may have a continuous configuration such as a groove or a undulation or a discontinuous configuration. These may be used singly or in combination. Continuous unevennesses may be, for example, arranged in one direction or crossed to form a lattice shape or randomly crossed as shown in FIG. 2. Discontinuous unevennesses may, for example, as shown in FIG. 3A to 3G take a round shape or a polygonal shape such as a star-like shape, a triangular shape, a rectangular shape or a cross shape, or an undefined shape or a combination of these. The configuration of the unevenness is not particularly limited. Among these unevennesses, the one having continuous recesses is particularly preferable. Further, it is desirable to uniformly and dispersedly form recesses over the entire recess-forming surface of the separator.

Such an unevenness is preferably formed on at least one surface of the separator, more preferably formed on the opposite surfaces of the separator. In the case that the unevenness is formed on one surface, it is desirable to construct the battery such that the uneven surface is faced to the negative electrode. By forming a space between the negative electrode and the separator by arranging the uneven surface to be opposed to the negative electrode, oxygen gas produced at the positive electrode and having permeated through the separator can be temporarily stored in the space (recesses of the uneven surface) at the negative electrode side. Thus, an increase in inner pressure can be suppressed even if an amount of the oxygen gas consumed at the negative electrode is smaller than an amount of the produced oxygen gas. Further, a contact area of the oxygen gas with the negative electrode is increased by forming such a space, and the amount of the oxygen gas consumed at the negative electrode is increased as compared to a separator having no uneven surface. Therefore, an increase in inner pressure accompanied by production of the oxygen gas can be effectively suppressed.

The depth of the recesses (average difference in elevation between the outer surfaces of the projections and those of the recesses on the uneven surface) when the separator has an uneven surface is preferably 6% or larger, more preferably 10% or larger, and preferably 50% or smaller, more preferably 40% or smaller of the apparent thickness of the separator (when a nonwoven fabric is used). (In the case that the separator is made of a porous film, this depth is preferably 6% or larger, more preferably 10% or larger, and preferably 60% or smaller, more preferably 50% or smaller of the apparent thickness of the separator.) If the depth of the recesses is below 6% of the apparent thickness, no sufficient space can be provided between the outer surface of the electrode and the separator, and an effect of the uneven surface may not be sufficiently obtained. If the depth of the recesses exceeds 50% (60% in the case of a porous film) of the apparent thickness, some portions of the separator are extremely thin, and a breakage and a short circuit may occur at these extremely thin portions when the battery is formed. Of course, such breakage and short circuit can be prevented by increasing the thickness of the recessed portions, which thickens the entire separator, standing as a hindrance to making the separator into a thin film.

It should be noted that the apparent thickness is a value obtained by measuring a thickness of a middle part of the separator using a digital thickness meter (Peacock digital thickness meter, load of 8.8 $g/cm^2$) whose measurement surface has a diameter of 31.5 mm, and an average value of measurement values obtained at 30 points of the separator. Further, the depth of the recesses can be measured by magnifying the cross section of the separator 300 diameters by an optical microscope, measuring the thickness of the recesses (average value of 30 points) and subtracting the thickness of the recesses from the apparent thickness.

In the present invention, a rate of an area of the recessed portions to the entire area of the uneven surface of the separator is preferably 5% or higher, more preferably 10% or higher and preferably 50% or lower, more preferably 30% or lower if the separator is made of an unwoven fabric. This rate is preferably 3% or higher, more preferably 5% or higher and preferably 50% or lower, more preferably 30% or lower if the separator is made of a porous film. If the area rate of the recessed portion falls within this range, oxygen gas produced at the time of excessive charging can be effectively dispersed at an interface between the electrode and the uneven surface of the separator, thereby suppressing an increase in inner pressure. Particularly, when the uneven surface is provided at the side toward the negative electrode, oxygen gas is effectively dispersed, and absorption of oxygen gas at the negative electrode effectively proceeds. If the area rate of the recessed portions is below 5% (3% in the case of the porous film), the above effect obtained by providing the uneven surface may not be sufficient. Further, if the area rate of the recessed portion exceeds 50%, it is not preferable because adhesion to the electrode may be reduced to increase an internal resistance of the battery. By forming such an unevenness whose area falls within this range, a better effect of suppressing the inner pressure of the battery can be displayed as compared to a separator having no uneven surface.

Even though being thin, the inventive separator is unlikely to cause a short circuit and the closed secondary battery using this separator has a satisfactory capacity retaining rate. Particularly, if the separator is formed with an uneven surface and the battery is constructed such that this uneven surface is opposed to the negative electrode, an even better effect of suppressing an increase in inner pressure can be obtained.

Hereinafter, a method for fabricating the inventive separator is described.

The inventive separator is made of an unwoven fabric, a porous film or the like as described above. Any desired organic resin can be used as a raw resin. However, a resin composition mainly composed of a polyolefin is recommendable because it does not undergo hydrolysis in an electrolytic solution and hydrophilic functional groups for trapping ammonia in the electrolytic solution can be easily introduced thereinto. Here, "mainly" means that 50 mass % or more (100% inclusive) of the resin composition is polyolefin. Accordingly, resin compositions mixed with organic resins other than polyolefin are also included. Polyolefin may be a resin singly composed of polyolefin or a resin composition which is a copolymer of olefin and an other monomer. Other monomers copolymerizable with olefin include, for example, styrene, vinyl butyrate and vinyl acetate. Particularly recommendable is polypropylene which is excellent in various properties including resistance to decomposition in an electrolytic solution, resistance to oxidation, and heat resistance during a hydrophilic treatment. Besides polypropylene, polyethylene, polymethylpentene, polybutene, polyethylene-propylene, polyethylene-butene-propylene, etc. may be, for example, used. Alternatively, fluoropolymers such as polyvinylidene fluoride and tetrafluoroethylene or polymers partially containing these may be used.

Of course, a resin having an arbitrary molecular weight from low molecular weight to ultra-high molecular weight may be singly or mixedly used. In the case of using a polyolefin, it is desirable to introduce desired hydrophilic functional groups by applying a hydrophilic treatment described later. For example, when a nonwoven fabric mainly containing a polyolefin is sulfonated by sulfur trioxide gas, the nonwoven fabric (separator) is easier to become hydrophilic if it has low-molecular-weight components. Conversely, since a nonwoven fabric (separator) having ultra-high-molecular-weight components has a high piercing strength, a possibility that electrode flushes pierce the separator, i.e. a short-circuit occurring rate when the separator is made thin can be reduced. Accordingly, it is desirable to make a nonwoven fabric or a porous film using a mixture of resins having different molecular weights.

A limiting viscosity of the resin forming the separator is preferably 0.2 dl/g or higher, more preferably 0.4 dl/g or higher and preferably 1.5 dl/g or lower, more preferably 1.0 dl/g or lower, further more preferably 0.9 dl/g or lower. If the resin having a limiting viscosity exceeding 1.5 dl/g is used, the separator has an excessively high acid resistance to oxidation and, accordingly, sulfonation may concentrate on the outer surface of the resin when the separator is immersed in, e.g. sulfuric acid for sulfonation, with the result that effective sulfonic groups may not be sufficiently introduced into the inside of the separator. If sulfonation concentrates on the outer surface of the separator as described above, the strength of the outer surface of the separator into which sulfonic groups were introduced is reduced and, therefore, a sufficient piercing strength may not be maintained. The sulfonated outer surface of the separator may be destroyed, thereby becoming easier to peel off. Thus, a sufficient amount of sulfonic groups may not be obtained as a whole. Further, if the limiting viscosity is below 0.2 dl/g, no sufficient piercing strength may be maintained. In measuring the limiting viscosity, a plurality of resin components are first separated according to the GPC method and then the limiting viscosity of the respective resin components are measured. It is sufficient that the separated resin components include a resin component having a limiting viscosity within the above range. A solvent, a column, sample producing conditions, a temperature and other factors used in the GPC analysis may be suitably adjusted so that the resin components can be separated.

If a plurality of resin components having different limiting viscosities are mixed, moldability during melt molding may be deteriorated. However, in the case that the separator is formed with unevenness, a satisfactory separator can be obtained even when different resin components are mixed. In the present invention, a ratio of weight average molecular weight to number average molecular weight of the raw resin used for the separator is desirably set at 20 or smaller in order to suppress deterioration of moldability.

Ultra high molecular weight polyethylene or ultra high molecular weight polypropylene is particularly preferably used as ultra high molecular weight polyolefin. In the case of mixing such an ultra high molecular weight polyolefin with other resin components, the content of ultra high molecular weight polyolefin with respect to the Metsuke of the separator is preferably 1% or higher, more preferably 3% or higher, further preferably 5% or higher. If the case of the content of ultra high molecular weight polyolefin below 1%, an effect brought about by mixture of ultra high molecular weight polyolefin may not be sufficiently obtained. On the other hand, if the content of ultra high molecular weight polyolefin exceeds 50%, the tensile strength of the separator becomes excessive, with the result that a sufficient processability may not be obtained. The content of ultra high molecular weight polyolefin is preferably 50% or lower, more preferably 25% or lower.

The resin may contain various additives such as an antioxidant, an ultraviolet protecting agent, an antistatic agent, a coloring agent and a flame retardant, and metallic components, and amounts of the additives and metallic components are not particularly limited and may be suitably determined within such a range as not to hinder the effects of the present invention.

In the case of using an unwoven fabric for the separator, a fabrication method of the unwoven fabric is not particularly restricted. For example, known methods including various dry methods such as a spunbond method, a melt-blowing method, a flash-spinning method, an air lay method and a card method, and a wet paper-making method may be adopted. The span bonding method and the melt-blowing method are desirable in view of uniformity of the unwoven fabric and fabrication costs. The unwoven fabric may not be fabricated by a single fabrication method, and may be an unwoven fabric having a multi-layer structure by placing unwoven fabrics fabricated by different methods one over another. Further, a chemical bonding method for bonding dry unwoven fabrics typically fabricated by the card method by an adhesive, or a thermal bonding method for bonding by means of self-adhesion or adhesive fibers may also be adopted. Furthermore, known methods such as a span-lacing method, a needle punching method and a stitch bonding method may be adopted as the interlacing method, and unwoven fabrics made by such methods can be used if fine processing is applied lest pin holes should be formed in the unwoven fabrics. Further, fibers may be interlaced by the wet paper-making method and an unwoven fabric can be fabricated using the desired fiber adhering method and interlacing method as in the dry methods.

It is recommendable that the diameters of the respective fibers forming the unwoven fabric lie in a range within which heat is sufficiently transferred to the fibers and the fibers are sufficiently pressurized when a heating treatment and a pressurizing treatment to be described later are applied. In view of this, the diameters of the fibers are preferably 50 $\mu$m or smaller, more preferably 30 $\mu$m or smaller. Further, the diameters of the fibers are preferably 1 $\mu$m or larger, more preferably 3 $\mu$m or larger in order to suppress deformation of the entire fibers by the pressurizing treatment or suppress a reduction in the strength of the unwoven fabric. Further, in the case of using a plurality of fibers, fibers having diameters lying within the above range may be used in combination.

In the present invention, the aforementioned resins may be singly used or two or more kinds of resins may be mixed as in core/sheath composite fibers, eccentric core/sheath (henshinmisayagata) composite fibers, side-by-side composite fibers, sea-island (umishimagata) composite fibers and split composite fibers. The resins used and how they are used are not particularly restricted. Among these fibers, core/sheath composite fibers are desirable since a separator having a high tensile strength can be obtained by the pressurizing treatment as described later. These composite fibers may be made by a known method.

If the separator is for a nickel-cadmium battery, a polyamide resin may be used in addition to the aforementioned resins.

If the case of fabricating an unwoven fabric using core/sheath composite fibers, desired resins can be used at the core side and the sheath side. However, it is preferable that polyethylene covers the outer surface as in a case where polypropylene/polyethylene (core/sheath) composite fibers are used. Since piercing strength and tensile strength after sulfonation may be reduced if the content of polyethylene is excessive, the content of polyethylene is preferably suppressed to 20% or lower (rate when the entire resin amount is assumed to be 100 mass %), more preferably to 5% or lower particularly when a low-density polyethylene is contained. Alternatively, polyethylene components may not be contained at all (in this case, single kind of fibers made of a resin other than polyethylene or composite fibers made by combining two kinds of resins other than polyethylene). For example, a polypropylene is used as a polyolefin in a resin composition mainly containing a polyolefin, and a ratio of polypropylene to polyethylene of such a resin composition is desirably 80:20 to 100:0 (it should be noted that no polyethylene is contained in the case of 100:0).

A method for fabricating the porous film according to the present invention is not particularly restricted. For example, known methods including a drawing method, a solvent extracting method and a punching method may be adopted. Specifically, the porous films according to the present invention include a film made porous by drawing an undrawn film, a film obtained by making an undrawn film mixed with extractable inorganic fine particles and producing porous by extracting a filler, a plasticizer, etc. using a solvent, and drawing the film before or after extraction, and a film made porous by projecting a laser beam onto a film. Alternatively, a porous film obtained by forming a uniform unwoven fabric containing fine fibers such as fibrils or split fibers into a film by thermal fusion or a porous film obtained by forming powdery or fibrous resins or a mixture thereof into a film by thermal fusion may also be used. Furthermore, a porous film may be fabricated by mixing air bubbles or a substance that produces air bubbles when a film is formed. Particularly it is recommendable to form a film having the same porosity (porosity of 20 volume % or higher) as the unwoven fabric by strengthening a stretch strength of the film or adding a large amount of a void forming agent. Various treatments can be applied to such films similar to the unwoven fabrics according to the present invention. Further, a film obtained by placing these unwoven fabrics one over another can also be satisfactorily used, and a film mixed with extra fine fibers such as split composite fibers can also be satisfactorily used. In the present invention, high-strength fibers mainly containing ultra high molecular weight polyolefin can similarly be used. For example, a method for forming a film by pressing an unwoven fabric made of fibrils or extra fine fibers after high-strength fibers are dispersed in the unwoven fabric can be satisfactorily used.

A method for forming an unevenness on the inventive separator is not particularly restricted. For example, various methods can be named which include a method for transferring the unevenness by pressing by means of an emboss roller or gear roller or by pressing together with a mold, a metallic mesh, a resin net, or the like, a method for cutting by a knife, a file or particles, or the like, a method by drawing and by flexing, a method for casting a separator onto an uneven net, a method for adhering resin spots and resin strings to the outer surface, a method for compressing or omitting a resin by partially melting it, and a method for drawing a raw polymer in which organic and/or inorganic particles having relatively large diameters and a high melting point are mixed so that particle portions protrude. The unevenness may be formed on the separator by arbitrarily combining these known methods. A timing at which the unevenness is formed on the separator is not particularly limited. It may be done before or after the hydrophilic treatment, or simultaneously with the hydrophilic treatment.

A method for forming a layer having a different property by, for example, arranging a net material made of thick fibers may be adopted to form the unevenness. However, this method complicates a process and cannot give a sufficient adhesion between the layers placed one over the other and adjacent to each other. Further, since the layer made of the thick fibers has a poor performance of retaining the electrolytic solution, a discharging characteristic at the time of high-speed discharging may be deteriorated.

It is recommendable to apply the hydrophilic treatment described later to the separator in order to cause the separator to retain the aforementioned unneutralized hydrophilic functional group amount. For example, a method for singly using a copolymer of a monomer containing a hydrophilic functional group and an olefin monomer, a method for mixing a polymer containing a hydrophilic functional group and a polymer not containing it, a method for making a hydrophobic polyolefin porous film hydrophilic by means of graft polymerization, sulfonation, addition of a surface active agent, corona treatment, plasma treatment, fluorine gas treatment, resin coating, etc. can be named as known techniques. These methods may be singly used or suitably combined to control the treatment conditions, thereby introducing the hydrophilic functional group into the separator to make it inventive separator.

In the case that the inventive separator is used in a nickel-hydrogen battery, it is recommended to use the separator having an extremely high ability of adsorbing ammonia or like impurities which free from the electrode. In order to obtain such a separator, it is preferable to form the aforementioned unevenness on a separator made of a resin mainly containing a polyethylene or polypropylene and introduce hydrophilic functional groups thereinto by means of sulfonation or graft polymerization.

In the present invention, known treatment methods such as a method for immersing the separator material in, for example, a sulfuric acid solution such as a heated sulfuric acid, a fuming sulfuric acid or a chlorosulfuric acid and a method for bringing the separator material into contact with sulfur trioxide gas may be adopted as the hydrophilic treatment. In the case of sulfonation, these treatment methods may be suitably combined. For example, a method for repeatedly immersing the separator material in a sulfuric acid or a fuming sulfuric acid and bringing it into contact with sulfur trioxide gas or sulfur dioxide gas, a method for bringing the separator material into contact with sulfur trioxide gas after immersing it in a heated sulfuric acid, and a method for bringing the separator material into contact with sulfur monoxide gas or mixed gas of sulfur dioxide and oxygen after a fluorine treatment may be named as such methods.

In order to fabricate the inventive separator containing the aforementioned hydrophilic functional groups (sulfonic groups), it is recommended to immerse a separator material not containing sulfonic groups (i.e. material before sulfonation) in a concentrated sulfuric acid bath having a temperature of 120° C. or higher and a concentration of 95% or higher for 1 to 10 min. Besides the concentrated sulfuric acid, any sulfuric acid arbitrarily selected from a sulfuric acid, a fuming sulfuric acid and $SO_3$ gas can be used (it should be noted that concentration is 95% or higher in any case). The use of the concentrated sulfuric acid of 95% or higher is most preferable in view of a treatment time. In the case of sulfonation using a concentrated sulfuric acid, the temperature of the concentrated sulfuric acid is preferably 120° C. or higher, more preferably 125° C. or higher and further more preferably 130° C. or higher. Further, in view of suppressing the reduction in the strength of the separator, this temperature is preferably 160° C. or lower, more preferably 150° C. or lower and most preferably 140° C. or lower. In view of productivity, a sulfonation time is preferably 10 min. or shorter, more preferably 5 min. or shorter and further more preferably 3 min. or shorter. Although a lower limit of the sulfonation time is not particularly limited, it is preferably 0.1 min. or longer, more preferably 0.3 min. or longer for sufficiently introducing sulfonic groups into the inside of the separator. Further, the concentration of the concentrated sulfuric acid is preferably 95% or higher, more preferably 97% or higher. As sulfonation is carried out at a higher temperature using a sulfuric acid having a high concentration, the inside of the separator is sulfonated within a shorter period of time. Thus, a reduction in the strength of the separator can be suppressed and an excellent self-discharging suppressing performance is displayed since the sulfonic groups are introduced into the inside of the separator.

According to the present invention, in the sulfuric acid heated at 120° C. or higher, a moderate reactivity is displayed despite a higher temperature as compared to conventional treatments by sulfur trioxide gas and a fuming sulfuric acid. Accordingly, the fibers of the nonwoven fabric can be sulfonated to the inside, coupled with softening of resin components of the nonwoven fabric at high temperature. In other words, the hydrophilic functional group, which could be given only to and near the outer surface of the separator by the conventional treatment method, can be caused to be present in a large quantity inside the separator. Therefore, according to the present invention, effective hydrophilic functional groups which are not neutralized even after the immersion in an alkaline solution can remain. Further, self-discharging can be sufficiently suppressed by a relatively small degree of sulfonation.

In order to sufficiently introduce sulfonic groups (hydrophilic functional groups) to the inside of the separator, it is recommended to apply a pretreatment, i.e. immerse the nonwoven fabric in a concentrated sulfuric acid bath having a temperature of 20 to 50° C. and a concentration of 90% or higher for 1 to 10 min. prior to the above treatment.

Although a mechanism of introducing the effective sulfonic groups into the inside of the separator by applying such a pretreatment is not clear, it is assumed that additives such as an antioxidant and low molecular-weight components contained in the separator, particularly those present at and near the outer surface of the separator fall off from the outer surface of the separator by the immersion in the sulfuric acid to form fine pores, and a sulfonating agent enters the inside of the separator through these fine pores.

Preferably, a concentrated sulfuric acid having a concentration of 90% or higher is used as a sulfuric acid used in the pretreatment. It is also recommended to control a bath temperature during immersion in the sulfuric acid in order to prevent only the outer surface of the separator from being sulfonated. For example, in the case that the separator is a nonwoven fabric or a porous film made of a resin composition mainly containing a polypropylene, the bath temperature is preferably 50° C. or lower, more preferably 40° C. or lower. A lower limit of the bath temperature is not particularly limited, and may be set at about room temperature, more preferably 10° C. or more.

When the obtained separator is immersed in a concentrated sulfuric acid (95% or higher) at 120° C. or higher as mentioned above after the pretreatment, the sulfuric acid easily enters clearances in the separator, thereby introducing the sulfonic groups into the outer surface of the separator and the inside thereof. Since the separator is immersed in a high-temperature bath of 120° C. or higher, it can be uniformly heated in its entirety. If the separator heated in this way is pressurized, the tensile strength thereof is improved. The tensile strength of the separator increases if the separator is pressurized preferably at 0.05 kPa or higher, more preferably at 0.3 kPa or higher, and preferably at 50 kPa or lower, more preferably at 30 kPa or lower. For example, in the case of a nonwoven fabric made of fibers, the strength of the nonwoven fabric is thought to increase because the outer surfaces of the heated fibers are melted and adhered by being pressurized. Particularly in the case of a nonwoven fabric made of core/sheath composite fibers containing a polypropylene (core) and a polyethylene (sheath), a melting effect by heating is easy to obtain since the polyethylene of the sheath has a low melting point.

In the case of a pressure below 0.05 kPa, a desired tensile strength may not be obtained because the outer surfaces of the fibers are not sufficiently melted and adhered. A pressure exceeding 50 kPa is not preferable since the shape of the fibers may be deformed.

The pressurizing method is not particularly restricted. For instance, intersections of the fibers may be melted and adhered by pressing by means of known heating rollers. However, a sufficient strength may not be obtained due to deformation of the fibers and cracks in the fibers. In order to prevent an occurrence of deformation and cracks, it is desirable to immerse the nonwoven fabric in a high-temperature solution as described above so that the nonwoven fabric has a high temperature (i.e. 120 to 150° C.) when being pressurized. In order to suitably melt and adhere the fibers by pressurizing, it is preferable to set a liquid temperature within a range of 5 to 40° C. below the melting point of the resin forming the fibers. However, the above effect may not be sufficient at a bath temperature below 120° C. Thus, the aforementioned core/sheath composite fibers in which the component having a lower melting point is arranged at the sheath side may be used. It should be noted that the tensile strength is improved by pressurizing even if the separator is a film.

In view of sulfonation and an increase in strength as mentioned above, the aforementioned treatment using the high-temperature sulfuric acid is recommendable. However, effects corresponding to those obtainable by the high-temperature sulfuric acid can be obtained if, for example, an other sulfonation method and a high-temperature liquid other than sulfuric acid are adopted and conditions equivalent to those of the treatment by the high-temperature sulfuric acid are set by suitably combining heating and pressurizing of the separator.

The graft polymerization is not particularly restricted. For example, a method for giving an energy by means of ultraviolet irradiation, plasma discharge or corona discharge at the same time a vinyl monomer or the like is brought into contact with a resin and a method using a catalyst may be adopted.

By applying the aforementioned hydrophilic treatment, desired hydrophilic functional groups such as sulfonic groups, carboxyl groups, carbonyl groups, hydroxyl groups, fluorine functional groups can be introduced into the separator.

As described above, the inventive separator is excellent in tensile strength, piercing strength and nitrate group trapping performance. The closed secondary battery using the inventive separator has a high capacity retaining rate by effectively suppressing its self-discharging. Further, if the inventive separator is used, a short-circuit occurring rate at the time of producing the batteries can be reduced. Particularly, if the inventive separator is used, nickel-hydrogen batteries, nickel-cadmium batteries or like secondary batteries having an excellent capacity retaining rate can be provided.

The secondary battery, disclosed in "High-Capacity Nickel-Metal Hydride Battery Super 350", Matsushita Technical Journal Vol. 44, No. 4 August (1998), is hereby in cooperated by reference.

Since the inventive separator has an excellent nitrate group trapping performance and a high piercing strength despite being thin, there is almost no likelihood of a short circuit during the production of the batteries and during the use thereof. Further, the closed alkaline battery using the inventive separator has an excellent capacity retaining rate (self-discharging suppressing ability). Further, since the inventive separator has an excellent oxygen gas permeability, oxygen gas being produced can be efficiently permeated, thereby suppressing an increase in inner pressure. Particularly, a better effect in suppressing an increase in inner pressure can be displayed by providing the separator with the unevenness.

Hereinafter, the present invention is described in more detail by examples. However, the present invention is not limited to the following examples and changes can be suitably made without departing from the content of the disclosure.

The respective properties of the examples in the present invention and the respective properties of the separator in the above description were measured by following methods.

Limiting Viscosity (100 ml) of tetralin was used as a solvent. After a sample (separator (0.114 g) was dissolved and the resulting solution was filtered by a glass filter, a measurement was made at a temperature of 135±0.1° C. using an Ubbelohde viscometer and a limiting viscosity was determined based on an extrapolation point of a straight line obtained by least squares approximation of a plot corresponding to the measured viscosity to an origin. Upon a measurement, a raw polymer was used as it was if it was powdery while being divided if it was a mass, and 1 wt % of antioxidant (product name: "Yoshinox BHT" produced by Yoshitomi Seiyaku) was added to the polymer and dissolved by being agitated at 135° C. for 5 hours to adjust a measurement solution. It should be noted that 0.2 mass % of BHT (2,4-di-t-butyl-p-creosol) was added in advance to the tetralin used to prevent deterioration of oxidation when the sample was melted. The concentration of the sample solution was set at 1 g/1000 cm$^3$. A value of 0.35 was used as a Huggins coefficient (k'). Concerning this measurement method, reference is made to "Experimental Chemistry Course 8, Polymer Chemistry (Volume I), 5$^{th}$ Chapter Viscosity, Nippon Kagakukai, May 15, 1963".

GPC

A measurement was made by the gel permeation chromatography, using an apparatus produced by Waters (150C ALC/GPC) and a column (GMHXL series) produced by Toso Kabushiki Kaisha. A molecular weight calibration curve was prepared using a polystyren-high molecular weight calibration kit produced by Polymer Laboratories. A sample solution used was prepared by dissolving a sample in a trichlorobenzene or octodichlorobenzene at 140° C. for about 8 hours.

Ion Exchange Amount

After being immersed in a HCL solution of 1 mol/dm$^3$ for 1 hour, a separator sample piece of 30 cm$^2$ was washed with an ion exchange water several times until its pH becomes 6 to 7. Subsequently, the sample piece was dried at 60° C. for 2 hours by a blow drier, cooled to room temperature. After being immersed in 100 cm$^3$ of KOH solution of 0.01 mol/dm$^3$ and shaken at 45° C. for 1 hour, the cooled sample piece was taken out and the solution 25 cm$^3$ was collected and titrated for neutralization using a HCL solution of 0.01 mol/dm$^3$. A blank solution was similarly titrated and a potassium ion exchange amount was calculated by equation (1):

$$\text{ion exchange amount (meq/m}^2\text{)} = \{(V0-V1) \times 100 \times 0.01 \times f\}/(0.003 \times 25) \quad (1)$$

where

V1: amount of the HCl solution (cm$^3$) required to titrate the sample

V0: amount of the HCl solution (cm$^3$) required to titrate the blank solution f: factor of the HCL solution.

Total Sulfur Amount

A separator sample piece of 30 cm$^2$ was completely burnt at a high temperature of 1400° C. in an oxygen gas flow, its concentration was measured by an infrared detector, and a sulfur amount was measured in accordance with a calibration curve prepared using a standard substance containing sulfur. Specifically, a measurement was conducted using a sulfur analyzer EMIA-120 produced by Kabushiki Kaisha Horiba Seisakusho. A basic principle involving a burnt portion of the above measurement method is equivalent to the flask burning method, i.e. a technique of completely burning sulfur in an oxygen gas flow and measuring a total sulfur amount including sulfur inside a nonwoven fabric. Concerning the flask burning method, reference is made to Basic Analytic Chemistry Course (11$^{th}$ Volume, Nippon Bunseki Kagakukai (Kyoritsu Publishing), pp. 34 to 43, September 1965).

Unneutralized Sulfonic Group Amount

An unneutralized sulfonic group amount was calculated by following equation (2) using measurement values of the total sulfur amount and the ion exchange amount:

$$\text{unneutralized hydrophilic functional group amount (mol/m}^2\text{)} = (\text{total sulfur amount (ppm)} \times \text{Metsuke (g/m}^2\text{)}/32.66/1000 - \text{ion exchange amount (meq/m}^2\text{))}/1000 \quad (2)$$

Capacity Retaining Rate

First, a positive electrode made of a nickel hydroxide paste, a negative electrode made of a hydrogen-occluded paste, and a separator were rolled to produce an SC size closed battery (capacity: 2400 mAh). A potassium hydroxide solution added with lithium hydroxide was used as an electrolytic solution of this battery.

This battery was held at 45° C. for 6 hours as an initial activation. Then, the battery was left in an air atmosphere of 20° C., charged at 0.2 C for 6 hours and discharged at 0.2 C (discharge end voltage: 1.0V). These charging and discharging were repeated 7 times.

Subsequently, the battery was charged at 0.2 C for 6 hours, a discharging capacity was measured at discharging of 0.2 C (end voltage: 1.0V) after a pause of 1 hour. The battery was then charged at 0.2 C for 6 hours, kept in an air atmosphere of 45° C. for 168 hours, and cooled at 20° C. for 6 hours, and a discharging capacity at discharging of 0.2 C (end voltage: 1.0 V) was measured to obtain a measurement value C1. Subsequently, this battery was charged at 0.2 C for 6 hours, and a discharging capacity at discharging of 0.2 C (end voltage: 1.0 V) after a pause of 1 hour was measured to obtain a measurement value C2. It should be noted that discharging of 0.2 C means discharging of the fully charged battery over 5 hours, and a current value during this discharging is set at a suitable value. A capacity retaining rate was calculated by following equation (3) using the above measurement values:

$$\text{capacity retaining rate } (\%) = C1 \times 2/(C0+C2) \times 100 \qquad (3)$$

A relationship between a self-discharging amount (%) and the capacity retaining rate (%) is expressed by following equation (4)

$$\text{capacity retaining rate} = 100 - \text{self-discharging amount} \qquad (4)$$

Metsuke (areal weight g/m²)

A sample piece (width: 2.5 cm, length: 10 cm) was collected from a separator, and Metsuke [g/m²] was set at a value obtained by converting a weight of the sample piece when being dried at a temperature of 60° C.±2° C. for 10 hours into a weight per 1 m². Metsuke was an average value of 20 sample pieces.

Thickness (Examples 1 to 11)

The thickness of a middle part of the above sample piece was measured under a load of 300 kPa. Specifically, the thickness was measured using a micrometer (Mitutoyo1102-25 type) whose load is 10 N and whose measurement surface has a diameter of 6 mm. The thickness was an average value of 50 sample pieces.

Apparent Thickness (Examples 12 to 23)

The thickness of the middle part of the above sample piece was measured using a digital thickness meter (peacock digital thickness meter, load: 8.8 g/cm²) whose measurement surface has a diameter of 31.5 mm. The apparent thickness was an average value of 30 sample pieces.

Recess Depth

The sectional profile of the separator was enlarged 300 times by an optical microscope to measure a thickness of a recessed portion. A recess depth was set at a difference between the thickness of the recessed portion and the apparent thickness and was an average value of 30 sample pieces.

Gas Permeability

Gas permeability was measured using a Fragile testing machine in accordance with the permeability measuring method specified by JIS L1096-1990 and was an average value of 20 sample pieces.

Tensile Strength

Using a sample piece having a width of 5 cm and a length of 15 cm, tensile strength in longitudinal direction (MD) was measured in accordance with JIS L1068 (fabric tensile testing method) with a spacing between gripped positions and a pulling speed set at 10 cm and 30 cm/min. The tensile strength was an average value of 20 sample pieces.

Piercing Strength

Piercing strength was set at a maximum load exerted on a needle when the needle whose leading end has a spherical shape of 0.5R and whose diameter is 1 mmΦ is lowered until piercing through a sample piece fixed in a round-hole holder having a diameter of 1.128 cm and an area of 1 cm² at a speed of 2 mm/sec. Specifically, piercing strength was measured using a KES-G5 handy compression testing machine produced by Katotec kabushiki Kaisha and was an average value of 100 sample pieces.

Short-circuiting Rate

A short-circuiting rate in the present invention was measured by a following method. A separator sample piece (2 cm square) was held between foam nickel plates cut into 1 cm squares and pressurized at a pressure of 0.5 MPa by the upper and lower foam nickel plates, and a resistance acting between the foam nickel plates after 30 sec. was measured. A Cellmet(Trademark) (Metsuke: 470 g/m², thickness: 1.6 mm) produced by Sumitomo Denko which is an urethane foam type foam nickel was used as the foam nickel. The resistance acting between the foamed nickel plates was measured by a digital multimeter (produced by Advantest) and a short circuit was judged if the measured resistance was below 10 MΩ. 100 sample pieces were measured and the short-circuiting rate was obtained by following equation:

Short-circuiting rate (%)=((number of cases where resistance is below 10 MΩ)/100)×100

Pore Diameter

Pore diameter was measured by a bubble point method whose measurement principle conforms to "ASTM F 316-86" using a porometer 2 produced by Coaltar.

Battery Inner Pressure

An inner pressure of a battery initially activated as described above was measured when the battery was charged at 0.5 C at an atmospheric temperature of 20° C. for 3 hours (charging depth: 150%).

Cycle Test

A cycle test was conducted for an initially activated battery in which one cycle is comprised of charging at 0.5 C for 2.4 hours (120%) and discharging having an end voltage of 1.0 V at 0.5 C. At this time, a lifetime was judged to have expired when a discharging capacity became 80% of an initial discharging capacity.

EXAMPLE-1

Figure 4:
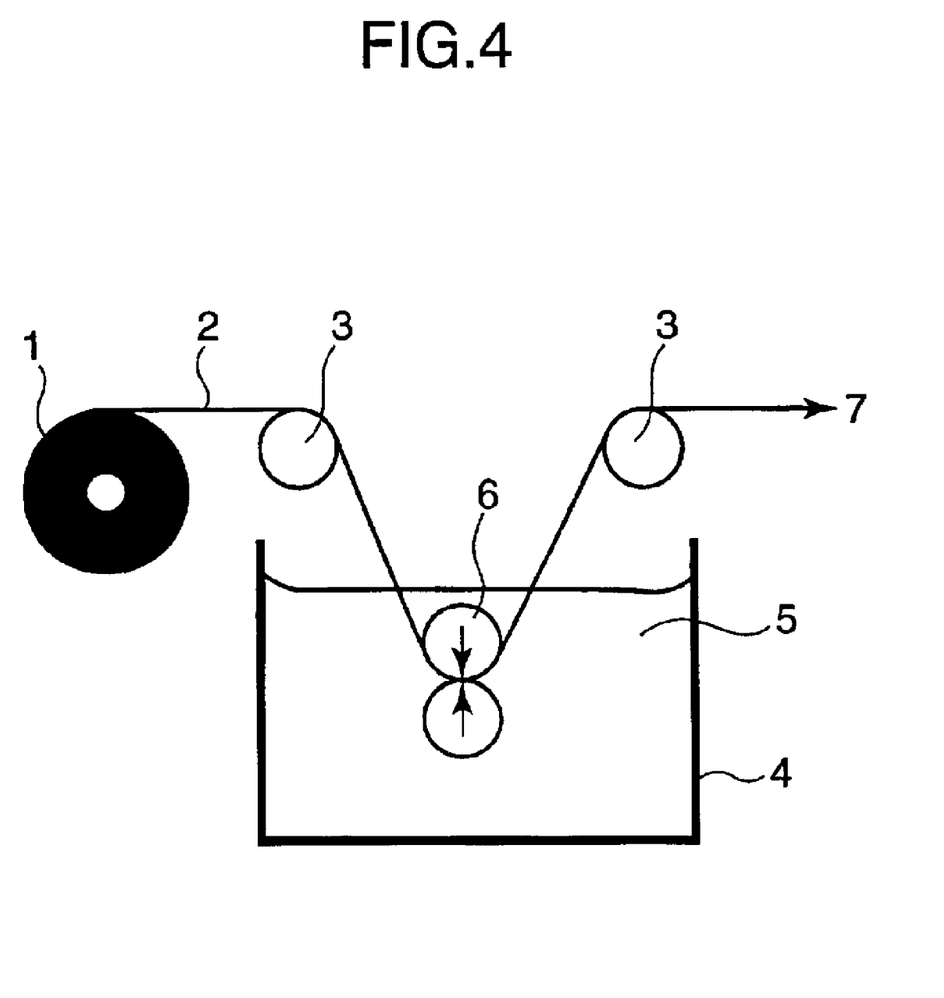
FIG. 4 is a schematic diagram showing an example of an apparatus for applying sulfonation using a high-temperature sulfuric acid.

A commercially available polypropylene nonwoven fabric 2 (limiting viscosity: 1.10 dl/g) having an average fiber diameter of 10 μm and a Metsuke of 40 g/m² and fabricated by the span bonding method was immersed in a 95% concentrated sulfuric acid 5 at 135° C. for 1 min. While being immersed in the high-temperature sulfuric acid, a pressure of 1.2 kPa was applied to the nonwoven fabric through tension adjustment of conveyance 3 and pressure adjustment of Teflon pressure rollers 6 disposed in the sulfuric acid. An apparatus for applying sulfonation by the high-temperature sulfuric acid at this time is summarily shown in FIG. 4. This nonwoven fabric was washed using a dilute sulfuric acid and an ion exchange water and dried at 70° C. to become a separator. This separator was incorporated into a battery and a capacity retaining rate was measured. Various properties of the separator and the capacity retaining rate of the battery are shown in TABLE-1.

EXAMPLE-2

A commercially available polypropylene nonwoven fabric different from that of EXAMPLE-1 only in Metsuke was immersed in a 98% concentrated sulfuric acid at 130° C. for 1 min. While being immersed in the high-temperature sulfuric acid, a pressure of 8.0 kPa was applied to the nonwoven fabric by a method similar to that of EXAMPLE-1 through tension adjustment of conveyance and pressure adjustment of Teflon pressure rollers disposed in the sulfuric acid. This nonwoven fabric was dried at 70° C. after being washed with pure water, thereby being formed into a separator. This separator was incorporated into a battery and a capacity retaining rate was measured. Various properties of the separator and the capacity retaining rate of the battery are shown in TABLE-1.

EXAMPLE-3

A polypropylene resin having a limiting viscosity of 0.58 dl/g was made into a nonwoven fabric on a collecting conveyor while being made into fibers through traction in an air flow of 250° C. and 0.6 kg/cm² with an extrusion temperature from an orifice and a single-hole discharge amount set at 220° C. and 0.5 g/min., respectively. After being immersed in a concentrated sulfuric acid of 98 mass % and 25° C. for 10 min., this nonwoven fabric was immersed in a concentrated sulfuric acid of 98 mass % and 135° C. for 3 min. (sulfonation), thereby obtaining a separator. A total sulfur amount of this separator was 13000 ppm and an ion exchange amount thereof was 1.50 meq/m$^2$. This separator was incorporated into a battery and a capacity retaining rate was measured. Various properties of the separator and the capacity retaining rate of the battery are shown in TABLE-1.

EXAMPLE-4

A nonwoven fabric was made of a polypropylene resin having a limiting viscosity of 0.78 dl/g by a method similar to that of EXAMPLE-3. After being immersed in a concentrated sulfuric acid of 98 mass % and 25° C. for 10 min., this nonwoven fabric was immersed in a concentrated sulfuric acid of 98 mass % and 130° C. for 4 min. (sulfonation), thereby obtaining a separator. A total sulfur amount of this separator was 12000 ppm and an ion exchange amount thereof was 1.75 meq/m$^2$. This separator was incorporated into a battery and a capacity retaining rate was measured. Various properties of the separator and the capacity retaining rate of the battery are shown in TABLE-1.

EXAMPLE-5

A separator was fabricated in a manner similar to EXAMPLE-1 except that the sulfonation conditions were changed. The sulfonation was carried out in a sulfur trioxide gas of 30° C. and 15% for 1 min. The obtained separator has a weak strength and an occurrence of a short circuit was observed when the separator was incorporated into a battery. The results are shown in TABLE-1.

EXAMPLE-6

A separator was fabricated in a manner similar to EXAMPLE-1 except that the sulfonation conditions were changed. The sulfonation was carried out through immersion in a fuming sulfur acid of 15% and 60° C. for 1 min. Since the obtained separator has no sufficient strength similar to EXAMPLE-5, an occurrence of a short circuit was observed when the separator was incorporated into a battery. The results are shown in TABLE-1.

EXAMPLE-7

A separator was fabricated in a manner similar to EXAMPLE-1 except that the sulfonation conditions were changed. The sulfonation was carried out through immersion in a high-temperature concentrated sulfur acid of 98% and 135° C. for 3 min. The obtained separator was more sulfonated than EXAMPLE-1, has a weak piercing strength and a high short-circuit occurring rate. The results are shown in TABLE-1.

EXAMPLE-8

A separator was fabricated in a manner similar to EXAMPLE-1 except that no pressure was applied during the sulfonation. The obtained has a weak piercing strength and a high short-circuit occurring rate. The results are shown in TABLE-1.

EXAMPLE-9

Core/sheath composite fibers (composite fibers in which a sheath made of a low-density polyethylene is concentrically arranged around a core made of a polypropylene) were used. A dry nonwoven fabric (Metsuke: 50 g/m$^2$) made of the core/sheath composite fibers (fiber diameter: 14 μm, fiber length: 30 mm) by the card method was subjected to sulfonation, washing and drying on the same conditions as in EXAMPLE-1. The obtained separator was blackened and very brittle. Since a large amount of sulfonated powder fell off during the measurement of an ion exchange amount necessary to calculate an unneutralized alkali-reactive amount, it was impossible to measure an effective functional group amount. Further, the separator experienced a short circuit upon producing a battery, and battery performances could not be measured. Various properties of this separator are shown in TABLE-1.

EXAMPLE-10

Core/sheath composite fibers (composite fibers in which a sheath made of a low-density polyethylene is concentrically arranged around a core made of a polypropylene) were used. A dry nonwoven fabric (Metsuke: 50 g/m$^2$) made of the core/sheath composite fibers (fiber diameter: 14 μm, fiber length: 30 mm) by the card method was subjected to sulfonation (immersion in a fuming sulfuric acid of 10% and 40° C. for 1 min.). The obtained separator has a weak piercing strength and an occurrence of a short circuit was observed when the separator was incorporated into a battery. These are thought to have caused by deterioration of the fibers during the sulfonation. The results are shown in TABLE-1.

EXAMPLE-11

A separator was fabricated in a manner similar to EXAMPLE-2 except that the sulfonation conditions were changed. The sulfonation was carried out through immersion in a concentrated sulfur acid of 95% and 110° C. for 15 min. Since the obtained separator was hardly sulfonated, no sufficient capacity retaining rate was obtained. The results are shown in TABLE-1.

TABLE 1

| | A | B | C | D | E | F | G | H | I | J | K | L | M |
|---|---|---|---|---|---|---|---|---|---|---|---|---|---|
| Ex. 1 | 40 | 90 | PP100 | 21 | 0.53 | SA95%, 135° C., 1 min. | 1.2 | 93 | 8.3 | 3 | 2500 | 2.6 × 10$^{-3}$ | 77.5 |
| Ex. 2 | 55 | 125 | PP100 | 15 | 0.58 | SA98%, 130° C., 1 min. | 8.0 | 167 | 11.1 | 0 | 4000 | 6.3 × 10$^{-3}$ | 78.1 |
| Ex. 3 | 50 | 120 | PP100 | 10 | 1.50 | SA98%, 135° C., 1 min. | 2.0 | 90 | 5.0 | 10 | 13000 | 18.4 × 10$^{-3}$ | 76.3 |
| Ex. 4 | 50 | 120 | PP100 | 10 | 1.75 | SA98%, 130° C., 3 min. | 2.0 | 95 | 5.5 | 8 | 12000 | 16.6 × 10$^{-3}$ | 75.7 |
| Ex. 5 | 40 | 90 | PP100 | 21 | 4.09 | SO$_3$Gas 15%, 30° C., 1 min. | 1.2 | 68 | 3.9 | 85 | 3500 | 2.9 × 10$^{-4}$ | 65.3 |
| Ex. 6 | 40 | 90 | PP100 | 21 | 3.59 | FSA15%, 60° C., 1 min. | 1.2 | 71 | 4.2 | 70 | 3200 | 4.1 × 10$^{-4}$ | 68.2 |
| Ex. 7 | 40 | 90 | PP100 | 21 | 1.75 | SA98%, 135° C., 3 min. | 1.2 | 87 | 4.9 | 47 | 11000 | 1.2 × 10$^{-2}$ | 77.4 |
| Ex. 8 | 40 | 90 | PP100 | 21 | 0.53 | SA95%, 135° C., 1 min. | N.P. | 83 | 4.8 | 59 | 2500 | 2.6 × 10$^{-3}$ | 77.7 |

TABLE 1-continued

| | A | B | C | D | E | F | G | H | I | J | K | L | M |
|---|---|---|---|---|---|---|---|---|---|---|---|---|---|
| Ex. 9 | 50 | 120 | PP50/LDPE50 | 23 | — | SA95%, 135° C., 1 min. | 1.2 | 30 | 1.8 | 100 | 8600 | Unmeasurable | Unmeasurable |
| Ex. 10 | 60 | 120 | PP50/LDPE50 | 23 | 3.43 | FSA10%, 40° C., 1 min. | N.P. | 45 | 4.2 | 50 | 2800 | $0.95 \times 10^{-3}$ | 69.8 |
| Ex. 11 | 55 | 125 | PP100 | 15 | 0.06 | SA95%, 105° C., 15 min. | 8.0 | 152 | 6.4 | 37 | 150 | $2 \times 10^{-4}$ | 63.7 |

A METSUKE (g/m$^2$)
B Thickness ($\mu$m)
C Resin Composition (mass %)
D Gas Permeability (cc/cm$^2$/s)
E Ion Exchange Amount (meq/m$^2$)
F Sulfonation conditions
G Pressure During Pressurizing (kPa)
H Tensile Strength (N/5 cm)
I Piercing Strength (N/5 cm)
J Short-Circuiting Rate (%)
K Sulfur Amount (ppm)
L Unneutralized Acid Group Amount (mol/m$^2$)
M Capacity Retaining Rate (%)
SA Sulfuric Acid
FSA Fuming Sulfuric Acid
N.P. No Pressure

EXAMPLE-12

Figure 1A:
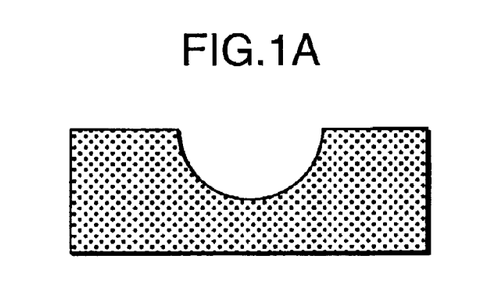
FIGS. 1A to 1F are sections showing exemplary unevennesses formed on an separator according to the invention.
Figure 1B:
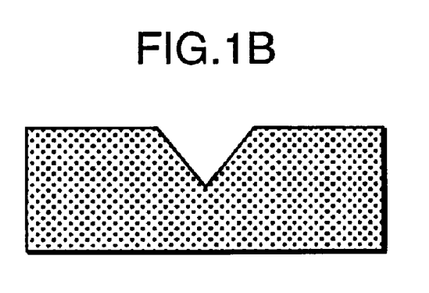
Figure 1C:
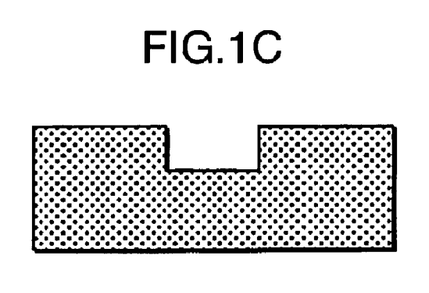
Figure 1D:
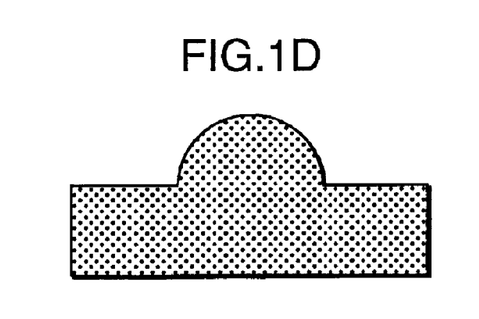
Figure 1E:
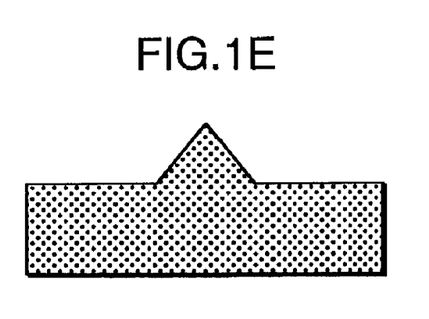
Figure 1F:
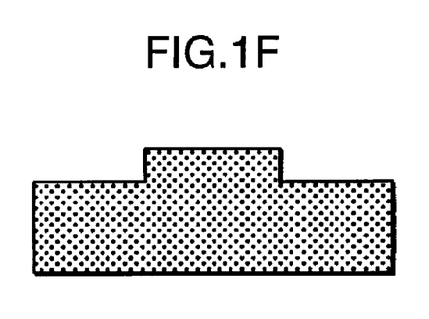

20 mass % of a polyethylene having a limiting viscosity of 4.1 and 10 mass % of an ultra molecular weight polyethylene resin having a limiting viscosity of 15.3 were added to and mixed with a mixture of 20 mass % of a pulverized silicic acid and 45 mass % of a dioctyl phthalate. The resulting mixture was melted and extruded at 160° C. by a film producing apparatus using a diaxial extruder having a T-die mounted therein to form a flat film having a thickness of 150 $\mu$m. This film was immersed in a methylene chloride for 15 min. to extract the dioctyl phthalate, dried and immersed in 5 mol/l of a potassium hydroxide solution at 80° C. for 1 hour to extract the pulverized silicic acid. This film was drawn again using a diaxial drawing apparatus to obtain a polyethylene porous film having a thickness of 75 $\mu$m. The resulting film was pressurized using a gear roller formed with projections having a width of 0.5 mm and continuos grooves and having an area rate of projections of 10%, and a flat roller made of a stainless steel, which rollers were heated at 120° C., thereby forming continuous groove-like recesses only on one surface (a specific state of the film after formation of the recesses is such that grooves shaped as in FIG. 1A are uniformly present as in FIG. 2B). After being exposed to sulfuric trioxide gas having a concentration of 35% at room temperature for 2 min., this film was washed using a concentrated sulfuric acid, a dilute sulfuric acid and pure water. Thereafter, this film was dried at 75° C. after being immersed in a 0.5% alkyl phenyl ether sodium sulfonate solution, thereby obtaining a separator in the form of a porous film containing hydrophilic functional groups and having an unevenness on the outer surface. The results are shown in TABLE-2.

EXAMPLE-13

A raw material adjusted by melting and mixing 75 mass % of a polypropylene resin having a limiting viscosity of 3.8 and 25 mass % of an ultra molecular weight polypropylene resin having a limiting viscosity of 10.3 was melted and extruded at 200° C. using a biaxial extruder having a T-die mounted therein to obtain an undrawn polypropylene resin film. This undrawn film was drawn by 20% at low temperature between nip rollers held at 35° C. and then drawn at a high temperature of 125° C. to obtain a porous film. The resulting film was pressurized using a gear roller formed with projections having a width of 0.5 mm and continuos grooves, having an area rate of projections of 45% and heated at 135° C., and a flat roller made of a stainless steel heated at 100° C., thereby forming continuous groove-like recesses only on one surface (a specific state of the film after formation of the recesses is such that grooves shaped as in FIG. 1A are uniformly present as in FIG. 2B). A solution containing 20 mass % of an acrylic acid saturated in advance by nitrogen gas, 76.7 mass % of distilled water, 0.2 mass % of a benzophenone, 0.1 mass % of a ferrous sulfate and 3.0 mass % of a nonionic surface active agent was sprayed onto this film having an unevenness, ultraviolet rays are projected thereonto by a low-pressure mercury lamp for 5 min., thereby carrying out graft polymerization of the acrylic acid. Then, the film was washed several times using pure water and dried at 80° C., thereby obtaining a separator in the form of a porous film in which hydrophilic pores and hydrophobic pores coexist and which has an unevenness on the outer surface. The results are shown in TABLE-2.

EXAMPLE-14

35 mass % of a copolymer resin of a polyethylene having a limiting viscosity of 4.5 and a polyvinyl alcohol and 5 mass % of an ultra molecular weight polyethylene having a limiting viscosity of 20.1 were added to and mixed with a mixture of 20 mass % of a pulverized silicic acid and 45 mass % of a dioctyl phthalate. The resulting mixture was melted and extruded at 160° C. by a film producing apparatus using a diaxial extruder having a T-die mounted therein to form a flat film having a thickness of 130 $\mu$m. This film was immersed in a methylene chloride for 15 min. to extract the dioctyl phthalate, dried and immersed in 5 mol/l of a potassium hydroxide solution at 80° C. for 1 hour to extract the pulverized silicic acid. This film was drawn again using a diaxial drawing apparatus to obtain a porous film made of a polyethylene-polyvinyl alcohol copolymer resin and having a thickness of 62 $\mu$m. The resulting film was pressurized using a gear roller formed with projections having a width of 0.5 mm and continues grooves, having an area rate of projections of 20% and heated at 110° C., and a flat roller made of a stainless steel and heated at 60°, thereby forming continuous groove-like recesses only on one surface. In this way, there was fabricated a separator in the form of a porous film of EXAMPLE-7 which contains a hydrophilic functional group and has an unevenness on the outer surface (a specific state of the film after formation of the recesses is such that grooves shaped as in FIG. 1A are uniformly present as in FIG. 2B). Various properties of the separator and a discharging capacity ratio and an inner pressure during charging of a battery in which this separator is used with its uneven surface opposed to a negative electrode are shown in TABLE-2.

EXAMPLE-15

A commercially available polypropylene nonwoven fabric (SLF50120 produced by Nippon Kodo Shikogyo: average fiber diameter of 12 μm and Metsuke of 50 g/m$^2$) at a line pressure of 3 MPa using a gear roller having an area rate of projections of 20% (roller temperature: 150° C.) and a stainless flat roller heated at 140° C., thereby forming groove-like recesses only on one surface. This nonwoven fabric was immersed in a concentrated sulfuric acid of 97% and 130° C. for 5 min., washed using pure water, and dried at 60° C. to obtain a separator. The results are shown in TABLE-2. It should be noted that, in the case that an unevenness was formed only on one surface, the uneven surface was faced toward a negative electrode.

EXAMPLE-16

Pressurizing was carried out using an emboss roller having an area rate of projections of 10% and heated at 150° C. instead of the gear roller in EXAMPLE-15, thereby forming dot-shaped recesses only on one surface. This nonwoven fabric was immersed in a concentrated sulfuric acid of 97% at 130° C. for 5 min. After being washed using pure water, this nonwoven fabric was dried at 60° C. to obtain a separator. Various properties of the separator and estimation results of a battery using this separator are shown in TABLE-2.

EXAMPLE-17

A separator was fabricated by a method similar to EXAPLE No. 16 except that pressurizing was carried out using an emboss roller having an area rate of projections of 40% (temperature: 150° C.). The results are shown in TABEL-2.

EXAMPLE-18

The same nonwoven fabric as used in EXAMPLE-15 was placed on a net made of glass fibers (Crenette G3300 produced by Kuraray) and pressurized by calendar rollers (both upper and lower rollers are flat rollers made of a silicone rubber, line pressure: 3 MPa), thereby transferring a lattice-shaped unevenness to the nonwoven fabric. An area rate of projections at this time was 25%. The resulting nonwoven fabric was immersed in a concentrated sulfuric acid of 97% and 130° C. for 5 min., washed using pure water, and dried at 60° C. to obtain a separator. The results are shown in TABLE-2.

EXAMPLE-19

Figure 2A:
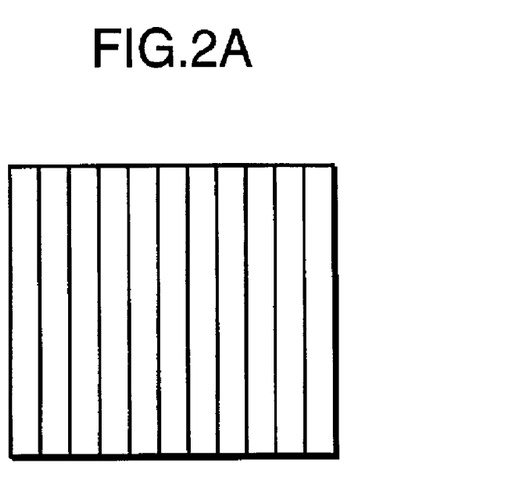
FIGS. 2A to 2D are diagrams illustrating unevennesses formed on the separator when viewed from above.
Figure 2B:
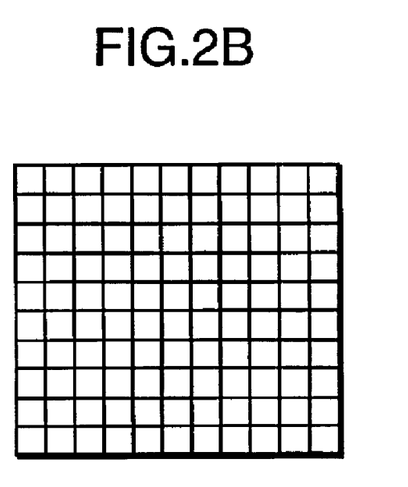
Figure 2C:
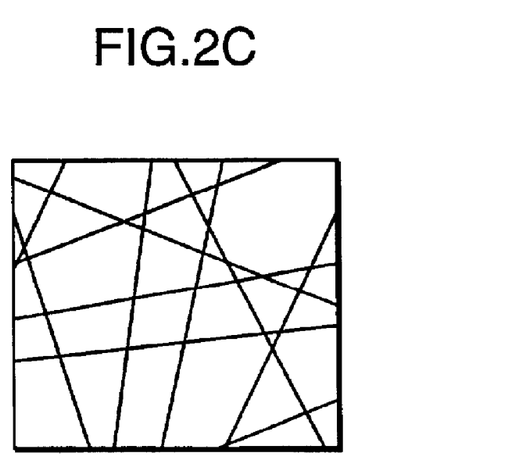
Figure 2D:
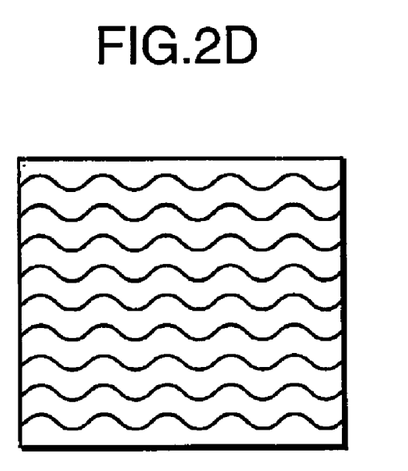
Figure 3A:
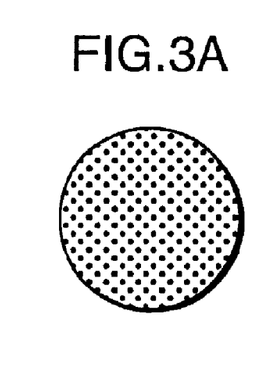
FIGS. 3A to 3G are diagrams illustrating unevennesses formed on the separator when viewed from above.
Figure 3B:
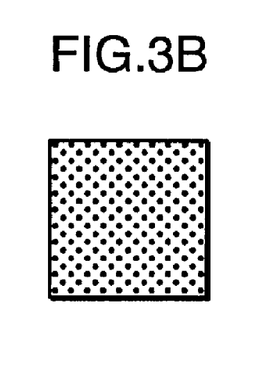
Figure 3C:
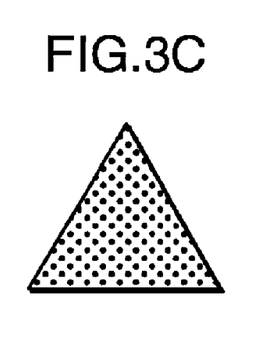
Figure 3D:
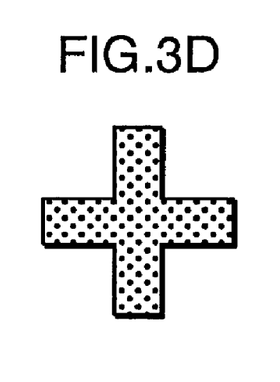
Figure 3E:
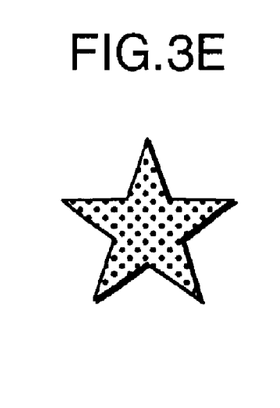
Figure 3F:
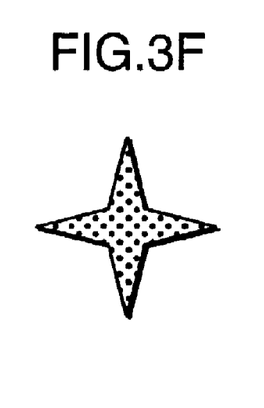
Figure 3G:
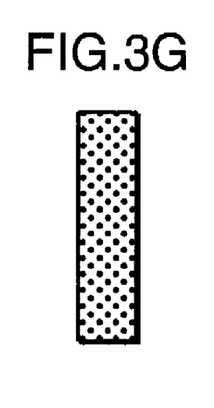

There was fabricated a separator same as EXAMPLE-12 except that, after the drawing process after the extraction of the pulverized silicic acid and the dioctyl phthalate was carried out twice, the nonwoven fabric was pressurized using a gear roller formed with projections having a width of 0.5 mm and continuos grooves, having an area rate of projections of 10%, and a flat roller made of a stainless steel heated at 60° C., thereby forming continuous groove-like recesses only on one surface (a specific state of the film after formation of the recesses is such that grooves shaped as in FIG. 1A are uniformly present as in FIG. 2B), and then the nonwoven fabric was made hydrophilic by the method of EXAMPLE-12. An occurrence of a short circuit was observed when this separator was incorporated into a battery. The results are shown in TABLE-2.

EXAMPLE-20

There was fabricated a separator same as EXAMPLE-12 except that a polyethylene resin having a limiting viscosity of 4.1 and not containing ultra high molecular weight polyethylene components was used as polyolefin resin components and a gear roller having an area rate of projections of 65% was used in the unevenness forming process An occurrence of a short circuit was observed when this separator was incorporated into a battery. The results are shown in TABLE-2.

EXAMPLE-21

A separator was fabricated as in EXAMPLE-15 except that the temperature of the rollers was 165° C. The results are shown in TABLE-2. Attempts were made to produce batteries using this separator, but all the batteries were either broken or short-circuited during winding and could not be satisfactory. The results are shown in TABLE-2.

EXAMPLE-22

A pressure is applied to the same nonwoven fabric as in EXAMPLE-15, using an emboss roller having an area rate of projections of 3% and heated at 140° C. to form dot-shaped recesses only on one surface. The resulting nonwoven fabric was immersed in a concentrated sulfuric acid of 97% at 130° C. for 5 min., washed using pure water and dried at 60° C. to obtain a separator. The results are shown in TABLE-2.

EXAMPLE-23

A battery was produced by mounting the separator of EXAMPLE-15 such that its surface free from unevenness was opposed to a negative electrode. The results are shown in TABLE-2.

TABLE 2

|  | N | O | P | Q | R | S | T | U | V | W | X |
|---|---|---|---|---|---|---|---|---|---|---|---|
| Ex. 12 | 40 | 80 | 25 | 10 | 12.0 | 8.0 | 0 | 2.9 | 100 | 1.05 | >1000 |
| Ex. 13 | 25 | 40 | 20 | 45 | 2.5 | 6.0 | 1.0 | 3.9 | 98 | 0.86 | >1000 |
| Ex. 14 | 32 | 65 | 10 | 20 | 21.0 | 6.5 | 3.0 | 3.2 | 100 | 0.92 | >1000 |
| Ex. 15 | 50 | 115 | 30 | 20 | 23.2 | 10.8 | 1.5 | 10.0 | 98 | 0.81 | >1000 |
| Ex. 16 | 50 | 120 | 45 | 10 | 27.0 | 10.6 | 1.0 | 10.5 | 97 | 0.90 | >1000 |
| Ex. 17 | 50 | 115 | 45 | 40 | 26.8 | 11.2 | 2.0 | 8.0 | 95 | 0.74 | >1000 |
| Ex. 18 | 50 | 140 | 30 | 25 | 33.5 | 10.9 | 0.5 | 10.0 | 97 | 0.76 | >1000 |
| Ex. 19 | 35 | 70 | 35 | 10 | 8.0 | 3.5 | 70.0 | — | — | — | — |
| Ex. 20 | 50 | 120 | 5 | 65 | 12.5 | 1.5 | 85.0 | — | — | — | — |
| Ex. 21 | 50 | 110 | 50 | 20 | 10.5 | 1.7 | 100 | — | — | — | — |

TABLE 2-continued

|        | N  | O   | P  | Q  | R    | S    | T   | U    | V  | W    | X   |
|--------|----|-----|----|----|------|------|-----|------|----|------|-----|
| Ex. 22 | 50 | 115 | 30 |  3 | 24.5 | 11.2 | 1.5 | 10.0 | 58 | 3.29 | 580 |
| Ex. 23 | 50 | 115 | 30 | 20 | 23.2 | 10.8 | 1.5 | 10.0 | 60 | 3.53 | 300 |

N METSUKE (g/m²)
P Recess Depth (μm)
R Average Pore Diameter (μm)
T Short-Circuiting Rate (%)
V Discharge Capacity Ratio (%)
X Cycle Lifetime (cycle)
O Apparent Thickness (μm)
Q Area Rate of Recesses (%)
S Piercing Strength (N/5 cm)
U Gas Permeability (cc/cm²/s)
W Battery Inner Pressure (MPa)
— N/A This application is based on Japanese Patent application Nos. 2000-334876 filed on Nov. 1, 2000, 2001-42043 filed on Feb. 19, 2001, 2001-107271 filed on Apr. 5, 2001, 2001-117200 filed on Apr. 16, 2001 and 2001-121436 filed on Apr. 19, 2001, the contents of which are hereby incorporated by references.

As this invention may be embodied in several forms without departing from the spirit of essential characteristics thereof, the present examples are therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A secondary battery separator made of a resin composition mainly containing a polyolefin having at least one hydrophilic functional group, characterized in that the resin composition has a content (ratio to a total resin amount) of a low-density polyethylene of 20 mass % or less, a piercing strength of 5 to 100 N, a Metsuke of 20 to 75 g/m², a thickness of 15 to 150 μm, and an unneutralized hydrophilic functional group amount of $1\times10^{-3}$ to $5\times10^{-2}$ mol/m², which amount is defined as follows:

unneutralized hydrophilic functional group amount (mol/m²)=(total sulfur amount (ppm)×Metsuke (g/m²)/32.66/1000−ion exchange amount (meq/m²))/1000.

2. A battery separator according to claim 1, wherein the polyolefin is a polypropylene.

3. A battery separator according to claim 1, wherein the hydrophilic functional group is at least one selected from a group comprising a sulfonic group, a carboxyl group and a hydroxyl group.

4. A battery separator according to claim 3, wherein the total sulfur amount of the separator is 2000 to 50000 ppm when the hydrophilic functional group is the sulfonic group.

5. A battery separator according to claim 1, wherein the ion exchange amount of the separator is 0.5 to 10 meq/m².

6. A battery separator according to claim 1, wherein the separator is in the form of a porous film or a nonwoven fabric.

7. A battery separator according to claim 1, wherein an unevenness is formed on at least one surface of the separator.

8. A battery separator according to claim 7, wherein an average difference in elevation between the outer surfaces of projections of the unevenness and those of recesses of the unevenness is 6 to 60% of the apparent thickness of a porous film when the separator is the porous film while being 6 to 50% of the apparent thickness of a nonwoven fabric when the separator is the nonwoven fabric.

9. A battery separator according to claim 7, wherein an area rate of recesses to the entire uneven surface of the separator is 3 to 50% when the separator is a porous film while being 5 to 50% when the separator is a nonwoven fabric.

10. A closed secondary battery containing the separator of claim 1.

11. A closed secondary battery characterized in that the uneven surface of the separator according to claim 7 is opposed to a negative electrode.

12. A method for fabricating a separator according to claim 1 containing a sulfonic group as the hydrophilic functional group, characterized by immersing a separator material in a concentrated sulfuric acid bath having a temperature of 120° C. or higher and a concentration of 95% or higher for 1 to 10 minutes.

13. A method according to claim 12, wherein the separator material is immersed in a concentrated sulfuric acid bath having a temperature of 20 to 50° C. or higher and a concentration of 90% or higher for 1 to 10 minutes before being immersed in the concentrated sulfuric acid bath having a temperature of 120° C. or higher and a concentration of 95% or higher.

14. A method of fabricating a separator, comprising the step of pressurizing a separator material obtained by the method according to claim 12.

15. A method according to claim 14, wherein the separator material is pressurized at 0.05 to 50 kPa.

16. A method for fabricating a separator, further comprising the step of pressurizing a separator material obtained by the method according to claim 13.

17. A method according to claim 16, wherein the separator material is pressurized at 0.05 to 50kPa.

18. A battery separator according to claim 1, wherein unneutralized hydrophilic functional groups are on the surface of and inside the resin composition.

* * * * *